(12) United States Patent
Silber et al.

(10) Patent No.: US 6,794,780 B2
(45) Date of Patent: Sep. 21, 2004

(54) MAGNETIC BEARING SYSTEM

(75) Inventors: Siegfried Silber, Kirchschlag (AT); Wolfgant Amrhein, Ottensheim (AT)

(73) Assignee: Lust Antriebstechnik GmbH, Lahnau (DE)

(*) Notice: Subject to any disclaimer, the term of this patent is extended or adjusted under 35 U.S.C. 154(b) by 40 days.

(21) Appl. No.: 10/169,172

(22) PCT Filed: Dec. 22, 2000

(86) PCT No.: PCT/EP00/13146
§ 371 (c)(1),
(2), (4) Date: Jun. 27, 2002

(87) PCT Pub. No.: WO01/48389
PCT Pub. Date: Jul. 5, 2001

(65) Prior Publication Data
US 2003/0001447 A1 Jan. 2, 2003

(30) Foreign Application Priority Data
Dec. 27, 1999 (AT) .............................. 2184/99

(51) Int. Cl.⁷ .................................. H02K 7/09
(52) U.S. Cl. .................................... 310/90.5
(58) Field of Search .................. 310/90.5, 181

(56) References Cited

U.S. PATENT DOCUMENTS

| | | | |
|---|---|---|---|
| 3,877,761 A | 4/1975 | Boden et al. | 310/90.5 |
| 3,890,019 A | 6/1975 | Boden et al. | 310/90.5 |
| 3,984,711 A * | 10/1976 | Kordik | 310/49 R |
| 4,037,886 A * | 7/1977 | Boden et al. | 310/90.5 |
| 4,077,678 A * | 3/1978 | Studer et al. | 310/90.5 |
| 4,387,935 A * | 6/1983 | Studer | 310/90.5 |
| 5,095,237 A * | 3/1992 | Bardas et al. | 310/90.5 |
| 5,111,102 A | 5/1992 | Meeks | 310/90.5 |
| 5,321,329 A * | 6/1994 | Hovorka | 310/90.5 |
| 5,347,190 A | 9/1994 | Lewis et al. | 310/90.5 |
| 5,514,924 A | 5/1996 | McMullen et al. | 310/90.5 |
| 6,166,469 A * | 12/2000 | Osama et al. | 310/90.5 |
| 6,262,508 B1 * | 7/2001 | Shibayama et al. | 310/181 |
| 6,563,244 B1 * | 5/2003 | Yamauchi et al. | 310/90.5 |

FOREIGN PATENT DOCUMENTS

JP 2001-041238 * 2/2001

* cited by examiner

Primary Examiner—Dang Le
(74) Attorney, Agent, or Firm—Collard & Roe, P.C.

(57) ABSTRACT

A magnetic bearing for generating magnetic forces. A configuration of electromagnetic poles and of permanent magnetic poles which, to the greatest possible extent, is planar enables the generation of a magnetic flux in the air gaps toward the rotor, also in the de-energized state. If this flux is modulated using a control flux, magnetic forces can be exerted upon the rotor for the purpose of providing magnetic support. This configuration makes it possible to provide magnetic bearings of a simple mechanical design.

33 Claims, 11 Drawing Sheets

MAGNETIC BEARING SYSTEM

CROSS REFERENCE TO RELATED APPLICATIONS

Applicants claim priority under 35 U.S.C. §119 of Austrian Application No. 2184/99 filed on 27 Dec. 1999. Applicants also claim priority under 35 U.S.C. §120 of PCT/EP00/13146 filed on 22 Dec. 2000. The international application under PCT article 21(2) was not published in English.

DESCRIPTION

The invention relates to an arrangement for generation of electromagnetic forces for the purpose of contactless magnetic bearing of rotors in rotating drives as well as actuators in linear drives.

Magnetic-bearing technology is opening up fields of application in mechanical and apparatus engineering with extremely exacting requirements on speed range, service life, cleanness and leak-tightness of the drive system—in other words in substantial areas of application that can be achieved not at all or only with difficulty by means of conventional bearing technologies. Various items, such as high-speed milling and grinding spindles, turbo compressors, vacuum pumps or pumps for high-purity chemical or medical products are already equipped with magnetic bearings.

The literature (Permanent Magnet Biased Magnetic Bearings—Design, Construction and Testing, published in 2nd International Symposium on Magnetic Bearing, Jul. 12 to 14, 1990, Tokyo, Japan; Magnetic Bearing Design for Reduced Power Consumption, published in ASME Transactions on Tribology, Vol. 118, No. 4, October 96, pp. 839 to 846, etc.) contains suggestions on how to reduce substantially the power loss of magnetic bearing systems by bias magnetization with permanent magnets. These suggestions take advantage of the fact that force generation in magnetic circuits is a quadratic function of flux density. If additional magnetization is superposed on a constant bias magnetization, large carrying forces can be generated with only small amounts of magnetomotive forces of the coils.

The technical problem to be solved by the invention is on the one hand to simplify the mechanical construction of a magnetic bearing and on the other hand to reduce the power consumption compared with conventional magnetic bearings having direct-current bias magnetization.

This technical problem is solved by a magnetic bearing system having the features of claim 1.

By the fact that the magnetic bearing system comprises at least one radial bearing, at least one electronic control unit and stator and rotor elements for generation of radial forces, wherein the flux-forming and flux-conducting stator and rotor elements are formed from ferromagnetic parts, coils and permanent magnets, and by the fact that permanent-magnetic poles having at least one permanent magnet as the independent pole are formed in the stator of the radial bearing between electromagnetic poles having at least one coil, and are disposed in such a way that a magnetic potential drop due to the fluxes generated by the permanent magnets is developed in the air gap in the angular regions of the electromagnetic poles, the mechanical construction of this bearing is very simple.

By a largely plane arrangement of electromagnetic poles and permanent-magnetic poles, a magnetic flux is generated in the air gaps to the rotor, even in the currentless condition. If this flux is modulated with a control flux, magnetic forces can be exerted on the rotor for the purpose of magnetic bearing. With this arrangement, a very simple mechanical construction of magnetic bearings having few electromagnetic and permanent-magnetic poles of very simple design is possible. Another major advantage is that the ferromagnetic part of the stator and especially of the stator return path can be made from one part, therewith eliminating problems of assembly and especially the problems of positioning tolerances of various individual parts to be joined. This fact is to be accorded particular importance, since the permanent magnets in particular can generally be made only with very large tolerances in the dimensions.

According to the invention, it is possible to choose the number of poles without restriction, and in this connection the number of poles excited by permanent magnets can if necessary match that of the electromagnetically excited poles. In another possible version, some of the limbs are not wound with coils.

A first embodiment of the inventive bearing is constructed in such a way that the magnetic flux generated by the permanent magnets passes in each case through the limbs of the electromagnetic poles and thus is responsible for the magnetic potential drop in the air gaps (also referred to as bias magnetization hereinafter). The magnetic flux generated by energization of the coils is closed mainly via the limbs of the neighboring electromagnetic poles. Only a negligible proportion of the flux is closed via leakage paths. In this way an increase in flux density is achieved in the air gap of the energized electromagnetic pole. In contrast, the flux density in the air gaps of the neighboring electromagnetic poles decreases.

According to another embodiment of the invention, the permanent-magnetic poles are designed and disposed in such a way that the air-gap flux in the regions of these poles is directed either commonly inward or outward, at least in the currentless condition.

A substantial advantage of this arrangement is that the magnetic flux generated by the coils passes only through the air gaps of the electromagnetically excited pole structures, but not through the permanent magnets, which are poorly magnetically conductive, and so a large change of flux density can already be achieved with a small magnetomotive force of the coil. In this way the electrical power consumption of the bearing can be drastically reduced compared with conventional coil bearings having direct-current bias magnetization.

According to the invention, it is advantageously provided that the air-gap flux in the angular regions of the electromagnetic poles can be adjusted via the magnitude and sign of the coil currents in such a way that this flux, comprising an electromagnetic component and a permanent-magnetic component, has different values in the air-gap regions of different electromagnetic poles, and so a known resultant radial force is impressed on the rotor via control of the coil currents. This has the advantage that large radial forces can already be generated with a small change of the coil currents.

The electromagnetic poles and the permanent-magnetic poles of a radial bearing are preferably disposed substantially in one plane.

The permanent-magnetic poles are advantageously designed and disposed in such a way that the control-flux proportion of the electromagnetic poles closed via the permanent-magnetic poles is smaller than the proportion closed via the electromagnetic poles. In another possible version, the control flux of the electromagnetic poles is closed practically not at all or only to a non-significant extent via the permanent-magnetic poles.

The permanent-magnetic poles are preferably designed and disposed in such a way that the magnets bound the air gap with at least one side face. This provision is expedient, because thereby the magnetic leakage flux becomes minimal.

The permanent-magnetic poles are advantageously designed and disposed in such a way that the boundary face at the air gap is formed by ferromagnetic material, especially by pole shoes. This has the advantage that the flux density in the air gap between the permanent-magnetic pole structure and the shaft can be changed, and in particular reduced by a change in cross section of the pole shoe.

According to a further preferred embodiment, the permanent-magnetic poles are designed and disposed in such a way that the magnet is embedded in ferromagnetic material, and so a magnetic short-circuit flux of the magnet is limited by appropriately thin flux-conducting pieces driven to magnetic saturation. This has the advantage of simple and low-cost assembly of the magnets. Furthermore, the ferromagnetic material provides mechanical protection, and so the mechanical robustness of the bearing is substantially improved.

From the viewpoint of costs, a limb-type design of the electromagnetic poles with concentrated coils is advantageous.

The coils can also be of distributed and chorded design, which has the advantage that the distributions of magnetomotive force in the stator can be adapted to the requirements of the bearing.

For mechanical simplification of the bearing, it is possible to dispose, in the stator, next to the permanent-magnetic poles and/or the electromagnetic poles, some ferromagnetic pole structures not provided with coils.

Magnetic conduction of the permanent-magnetic and electromagnetic flux components in the rotor can take place through the ferromagnetic shaft itself. The advantage is that the shaft comprises a single unit.

For higher speeds, or if the shaft material is not permitted to be ferromagnetic, conduction of the permanent-magnetic and electromagnetic flux components in the rotor can take place through soft-magnetic materials in solid or laminated form.

By virtue of appropriate control of the coil currents, the sum of the fluxes added over the entire air-gap periphery advantageously yields a value equal to zero, and so simplified power electronics, comprising one half-bridge per phase, can be used.

By appropriate configuration of the pole geometry, especially by a largely parallel design of the side faces of the flux-conducting pieces or by provision of reductions of cross section in the region of the air gap, the electromagnetic poles are advantageously constructed in such a way that strong flux expansions toward the air gap are not formed, in order to create favorable conditions for force generation by means of a high flux density.

The inventive bearing system is preferably designed such that the permanent-magnetic poles, by appropriate configuration of the pole geometry, are constructed in such a way that strong flux concentrations toward the air gap are not formed, in order to minimize, in the event of a deflection of the shaft from the bearing center, not only the destabilizing effect of the permanent-magnetic field in the regions of the air gap via the permanent-magnetic pole but also the core losses in the rotor.

By appropriate configuration of the pole geometry, especially by an undercut-free design of the electromagnetic pole limbs, the electromagnetic poles and the permanent-magnetic poles are preferably constructed in such a way that prefabricated coils can be slipped on over the electromagnetic poles for the purpose of simple and low-cost assembly.

Advantageously the permanent-magnetic poles and/or the electromagnetic poles are provided with lateral concavities or indentations, in order to minimize the magnetic leakage between the poles.

By means of appropriate control of the coil currents of the radial bearing or radial bearings, a sum of the fluxes added over the entire air-gap periphery is advantageously impressed with a non-zero summation value, and so one flux component is closed via the shaft and a return path through the stators, and development of an axial force in addition to the radial force also takes place due to the asymmetric, especially axially offset position of stator and rotor.

The stator faces and rotor faces of the two radial bearings bounding the air gap are advantageously conically shaped in such a way that each of these radial bearings can develop both radial and axial force components via the control fluxes generated by the coils of the electromagnetic poles and via the permanent-magnetic flux component.

The coils or coil assemblies of the electromagnetic poles are advantageously star-connected or delta-connected and are supplied with power semiconductors in half-bridge circuitry, whereby not only a very simple mechanical construction but also a simple and thus low-cost electronic activation unit can be achieved.

If the bearing is to be operated with a non-zero current sum, the coils or coil assemblies of the electromagnetic poles are preferably supplied independently via power semiconductors in full-bridge circuitry.

The inventive bearing system is preferably provided with sensors and/or observers for determination of displacement signals. The electronic control unit in turn is provided with an electronic control unit and an electronic power unit.

According to the invention, the stator and rotor elements are intended for generation of radial and axial forces.

The minimum number of coils necessary for the inventive solution depends on the number of degrees of freedom to be stabilized. If two degrees of freedom are to be stabilized, at least two coils are necessary. If the inventive arrangement with three coils is used for stabilization of two degrees of freedom, a phase-current sum of zero may be required. Thus the phases may be star-connected or delta-connected, whereby a very simple power converter comprising only three half bridges can be used for activation.

If a disk-like rotor is a possible construction and only small forces occur in axial direction, the magnetic bearing with bias magnetization (this magnetic bearing is referred to as a multipole bearing hereinafter because of the alternating orientation of the flux density in the air gaps of the poles excited by permanent magnets and of the electromagnetically excited poles) can be used for stabilization of five degrees of freedom. In this case stabilization of the two radial degrees of freedom in the rotor plane can be achieved actively. In contrast, stabilization in axial direction and in tilting direction is possible by means of the reluctance forces.

A further embodiment of the invention makes it possible to stabilize five degrees of freedom actively with two multipole partial bearings. In principle, the partial bearings can have equivalent construction. At least one of the two multipole bearings, however, must contain at least three separately fed coils. If both the shaft and the return path are made of ferromagnetic material, a further flux path is created that once again passes completely through ferromagnetic material with the exception of the air gaps.

A six-limb multipole bearing, which in terms of complexity of manufacturing technology and in terms of operating parameters is optimized for a specified application, is also possible according to the invention. In this embodiment, the three permanent magnets are completely surrounded in the radial plane by ferromagnetic material.

On the one hand, extremely low-cost production is possible thereby, since permanent magnets with close tolerances are not necessary. On the other hand, the brittle magnet material is completely surrounded by metal sheet, and so mechanical forces cannot act on the magnet material. To ensure that a magnetic short circuit of the permanent magnets cannot occur, the flux-conducting pieces must be so thin that the ferromagnetic material in these regions is driven to saturation. Because of the mechanical robustness of this bearing, it can be used in applications in which, because of mechanical stress and strain, bias magnetization with permanent magnets has not been possible heretofore.

The operating and control behavior of magnetic bearings is characterized substantially by the current-force factor and the displacement-force factor. The current-force factor describes the relationship between the phase currents and the carrying forces. The displacement-force factor, on the other hand, describes how the force acting on the rotor changes in response to a displacement thereof. Thus the force-displacement factor is a measure of the "instability". What is desirable for operation is the largest possible current-force factor and at the same time a small displacement-force factor. Because of the taper of the electromagnetic poles, a high current-force factor is achieved with simultaneous minimization of the magnetic leakage flux. The displacement-force factor can be reduced if necessary by making the end face of the limb of the permanent-magnetic pole as large as possible. The constriction, in turn, achieves minimization of the leakage flux.

Further details of the invention can be inferred from the dependent claims.

A practical example of the invention is illustrated in the drawing, wherein:

FIG. 6b shows a section through line A—A of FIG. 6a;

FIG. 6c shows a section through line B—B of FIG. 6a;

Figure 1:
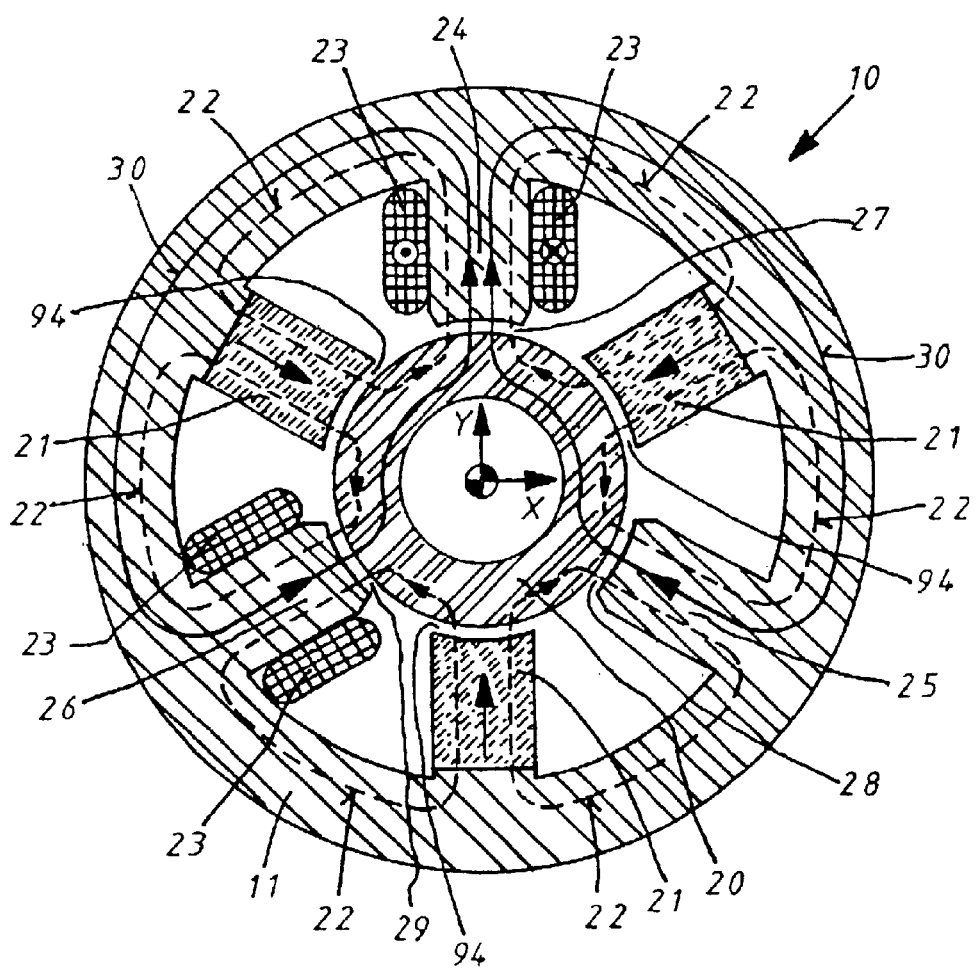
FIG. 1 shows a cross section through an inventive arrangement.

FIG. 1 illustrates a magnetic bearing (10) with a stator (11) and a rotor (20). Magnetic bearing (10) has three permanent-magnetic poles (21) as well as three electromagnetically excited poles (24, 25, 26). The number of permanent-magnetic poles (21) corresponds to the number of electromagnetically excited poles (24, 25, 26). Thus bearing (10) has a six-limb arrangement. Limb (24) is wound with a coil (23). The limb of electromagnetic pole (25) is not wound with coils.

The magnetic flux (22) generated by permanent magnetic poles (21) passes in each case through neighboring limbs and thus is responsible for the magnetic potential drop in the air gaps (27, 28, 29) (also referred to as bias magnetization hereinafter). The magnetic flux (30) generated by energization of coil (23) is very largely closed via limbs (25, 26). Only a negligible proportion of the flux is closed via leakage paths. Thus an increase of flux density is achieved in air gap (27). In contrast, the flux density in air gaps (28, 29) decreases.

The main advantage of this arrangement is that the magnetic flux generated by coil (23) passes only through air gaps (27, 28, 29) of the electromagnetically excited poles (24, 25, 26), but not through the permanent magnets (21), which are poorly magnetically conductive, and so a large change of flux density can already be achieved with a small magnetomotive force of the coil.

Figure 2:
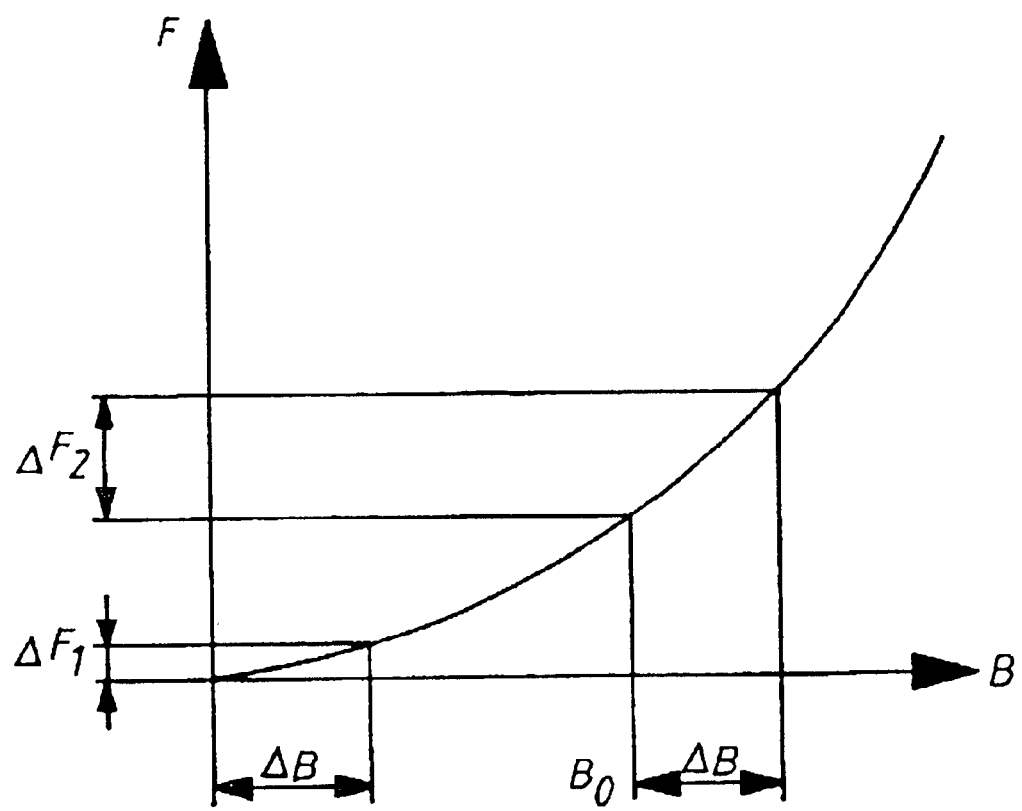
FIG. 2 shows a graphical diagram of a force acting on a ferromagnetic body.

As illustrated in FIG. 2, the magnetic force F acting on a ferromagnetic body is a quadratic function of the flux density B. Furthermore, the magnetic force increases linearly with the area of the ferromagnetic surface element. In the absence of bias magnetization, a change $\Delta B$ of the air-gap flux density produces a change $\Delta F_1$ of the normal component of the magnetic force. By means of bias magnetization $B_0$, a substantial increase $\Delta F_2$ of the magnetic force can be achieved with the same change $\Delta B$ of flux density. Thus, if a specified carrying force is to be generated with the magnetic bearing (10) illustrated in FIG. 1, a large change of the flux density—and thus a large current change—is necessary in the absence of bias magnetization, whereas only a small change of flux density is needed in the presence of bias magnetization.

During energization, in the indicated direction, of coil (23) of the bearing (10) illustrated in FIG. 1, the increase of flux density in air gap (27) produces a carrying force in positive y-direction. Because of the decrease of flux density in air gaps (28, 29), the carrying force in y-direction is also increased compared with the de-energized case. If all coils are de-energized, and if rotor (20) is located at the geometric center, the flux densities in air gaps (27, 28, 29) are equal, and so the resultant force on rotor (20) vanishes. In contrast, if rotor (20) is deflected from the geometric center while the winding systems are de-energized, different flux densities are developed in air gaps (27, 28, 29), and so a resultant force on rotor (20) is developed. This force can be used to compensate static external forces with displacement of the shaft axis.

Figure 3:
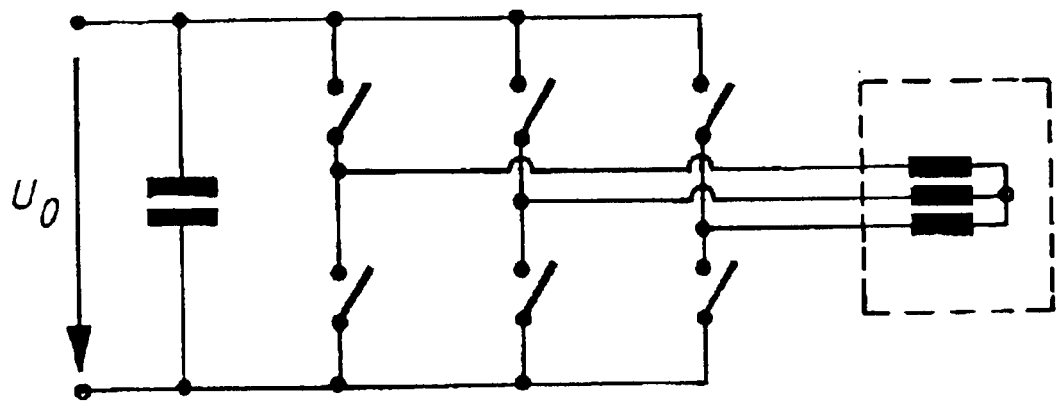
FIG. 3 shows a schematic diagram of a power converter.

The minimum number of coils necessary for the inventive solution depends on the number of degrees of freedom to be stabilized. If two degrees of freedom are to be stabilized, at least two coils are necessary. If the described arrangement with three coils is used for stabilization of two degrees of freedom, a phase-current sum of zero may be required. Thus the phases may be star-connected or delta-connected, whereby a very simple power converter comprising only three half bridges, as illustrated in FIG. 3, can be used for activation.

Figure 4:
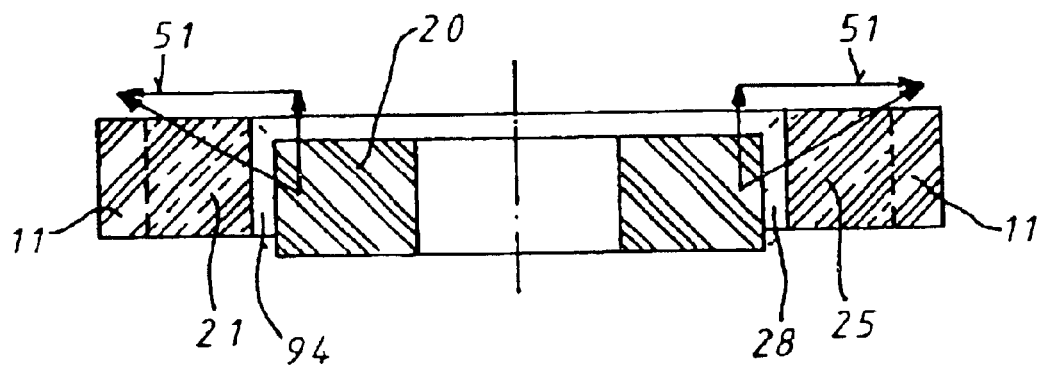
FIG. 4 shows a diagram of the stabilization of a rotor in axial direction.
Figure 5:
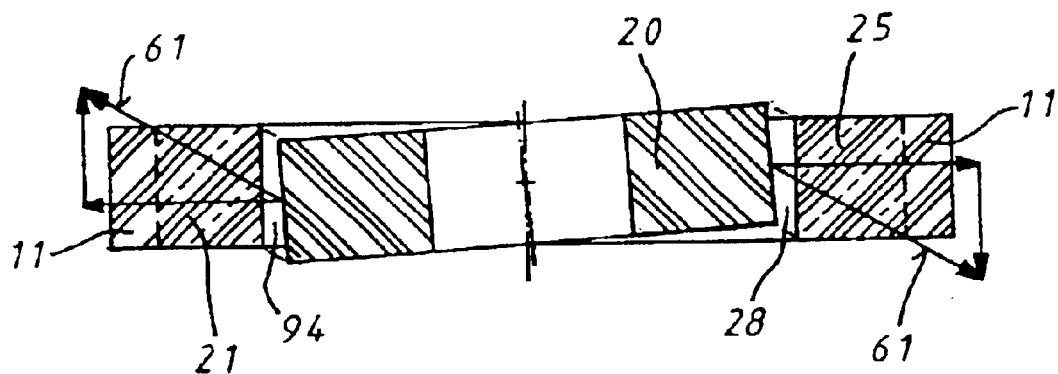
FIG. 5 shows a diagram of the stabilization of a rotor in tilting direction.

If a disk-like rotor is a possible construction and only small forces occur in axial direction, the magnetic bearing with bias magnetization (this magnetic bearing is referred to as a multipole bearing hereinafter because of the alternating orientation of the flux density in the air gaps of the poles excited by permanent magnets and of the electromagnetically excited poles) can be used for stabilization of five degrees of freedom. In this case stabilization of the two radial degrees of freedom in the rotor plane can be achieved actively. In contrast, stabilization in axial direction and in tilting direction is possible by means of the reluctance forces (51 and 61), as shown in FIGS. 4 and 5.

Figure 6A:
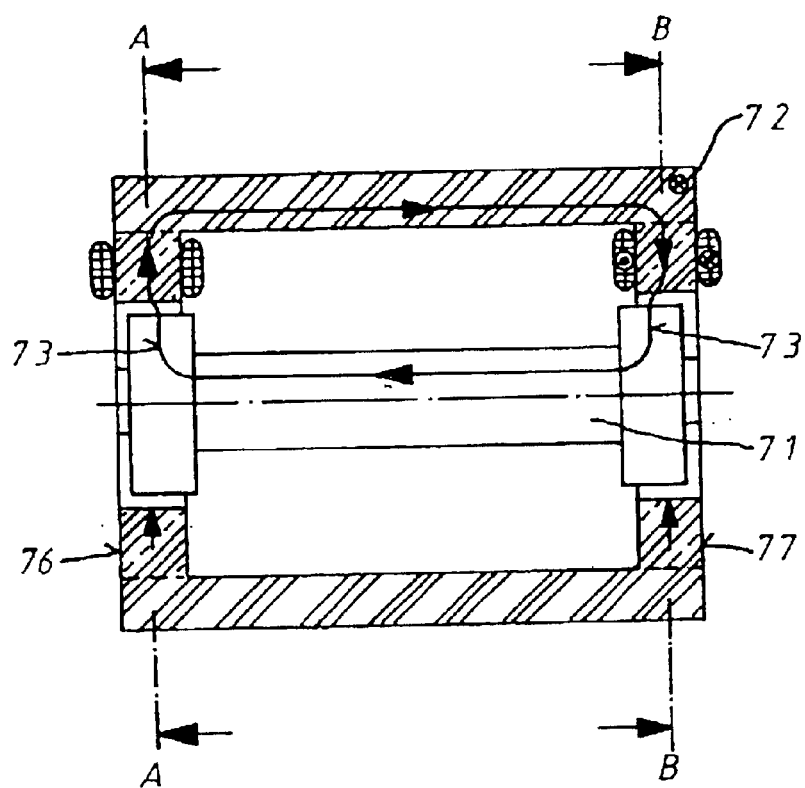
FIG. 6a shows a section through a multipole bearing.
Figures 6B, 6C:
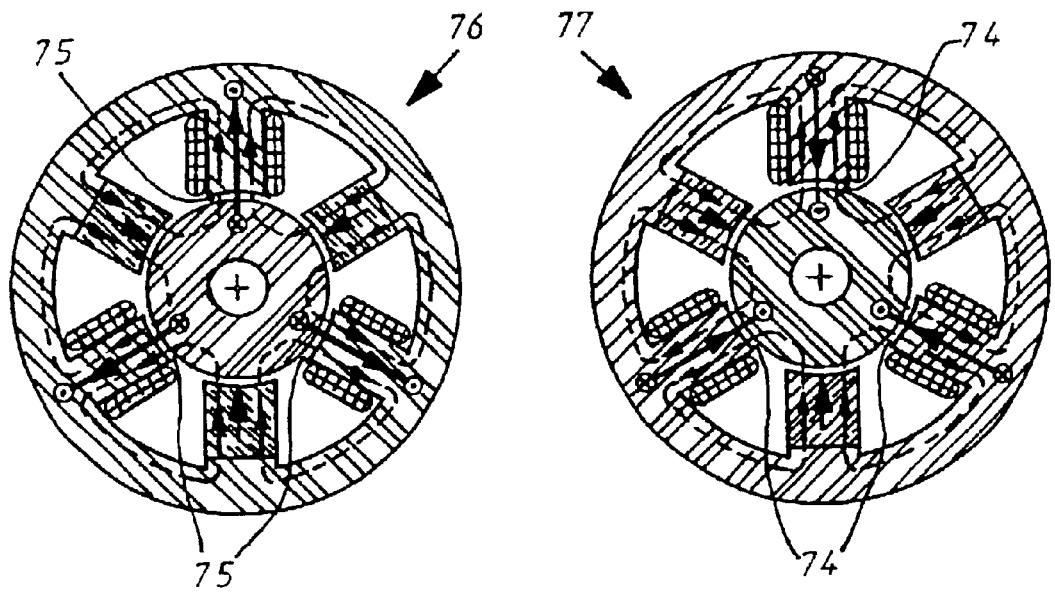

A further arrangement, illustrated in FIGS. 6a, 6b and 6c, shows how it is possible to stabilize five degrees of freedom actively with two multipole partial bearings (76, 77). The partial bearings (76, 77) have equivalent construction. The multipole bearing contains three separately fed coils. If both the shaft (71) and the return path (72) are made of ferromagnetic material, a further flux path is created that once again passes completely through ferromagnetic material with the exception of the air gaps. If activation of the left partial bearing takes place as illustrated in FIG. 6b, the indicated magnetic flux (73) is developed, whereby the flux density in air gaps (74) is weakened and that in air gaps (75) is strengthened.

By virtue of the different axial lengths of shaft (71) and of return path (72), an axial force on the rotor is developed. The described magnetic axial flux can be generated either with one partial bearing or with both partial bearings (76, 77).

Figure 7:
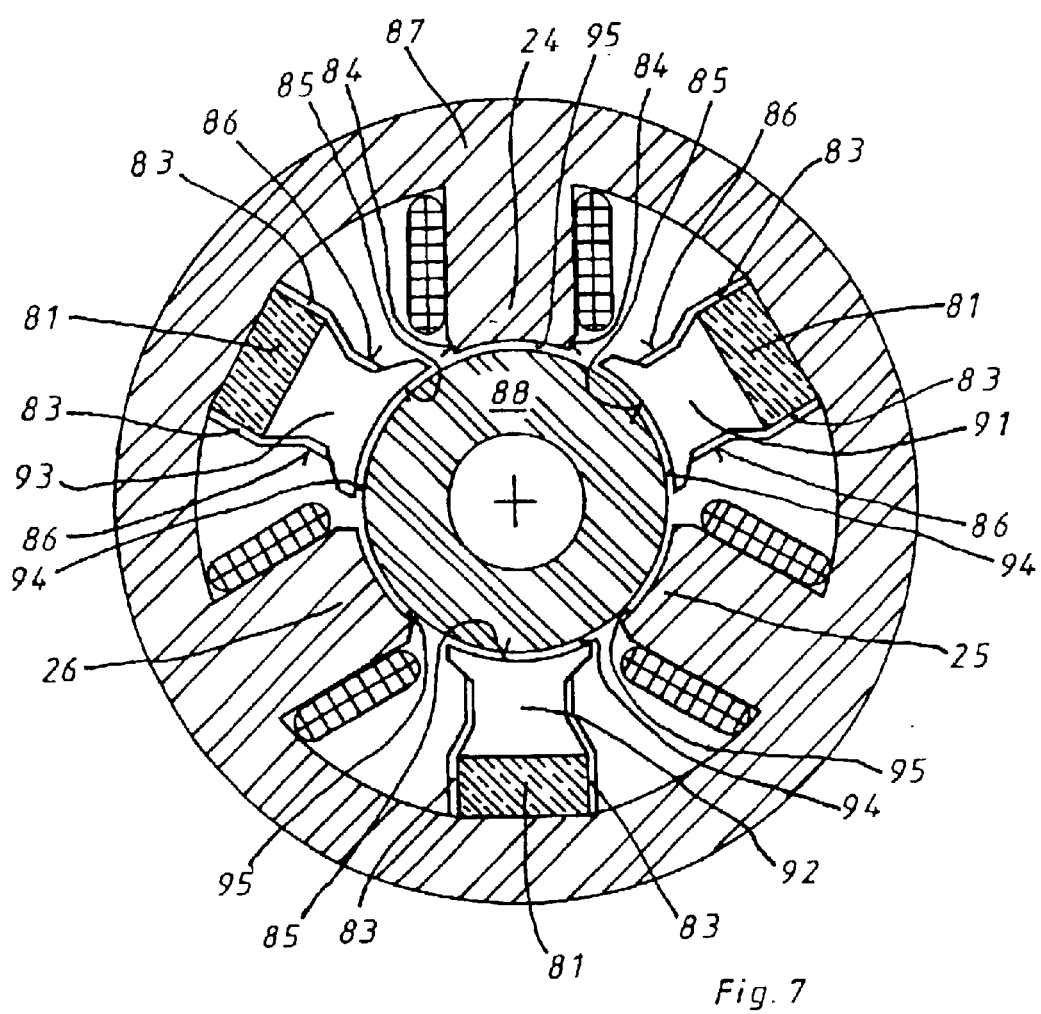
FIG. 7 shows a modified practical example.

FIG. 7 illustrates a six-limb multipole bearing, which in terms of complexity of manufacturing technology and in terms of operating parameters is optimized for a specified application, and which is equipped with a stator (87) and a rotor (88).

In this embodiment, the three permanent magnets (81) are completely surrounded by the ferromagnetic material of the stator (87). On the one hand, extremely low-cost production is possible thereby, since permanent magnets with close tolerances are not necessary. On the other hand, the brittle magnet material is completely surrounded by metal sheet, and so mechanical forces cannot act on the magnet material. To ensure that a magnetic short circuit of the permanent magnets cannot occur, the flux-conducting pieces (83) must be so thin that the ferromagnetic material in these regions is driven to saturation.

Because of the mechanical robustness of this bearing, it can be used in applications in which, because of mechanical stress and strain, bias magnetization with permanent magnets has not been possible heretofore.

The operating and control behavior of magnetic bearings is characterized substantially by the current-force factor and the displacement-force factor. The current-force factor describes the relationship between the phase currents and the carrying forces. The displacement-force factor, on the other hand, describes how the force acting on the rotor changes in response to a displacement thereof. Thus the force-displacement factor is a measure of the "instability". What is desirable for operation is the largest possible current-force factor and at the same time a small displacement-force factor. The geometric configuration of the multipole bearing illustrated in FIG. 7 is optimized in terms of the factors just described. Because of a taper (84) of the electromagnetic poles (24, 25, 26), a high current-force factor is achieved with simultaneous minimization of the magnetic leakage flux. The displacement-force factor can be reduced if necessary by making the end face (85) of the limb as large as possible. A constriction (86), in turn, achieves minimization of the leakage flux.

Figure 8:
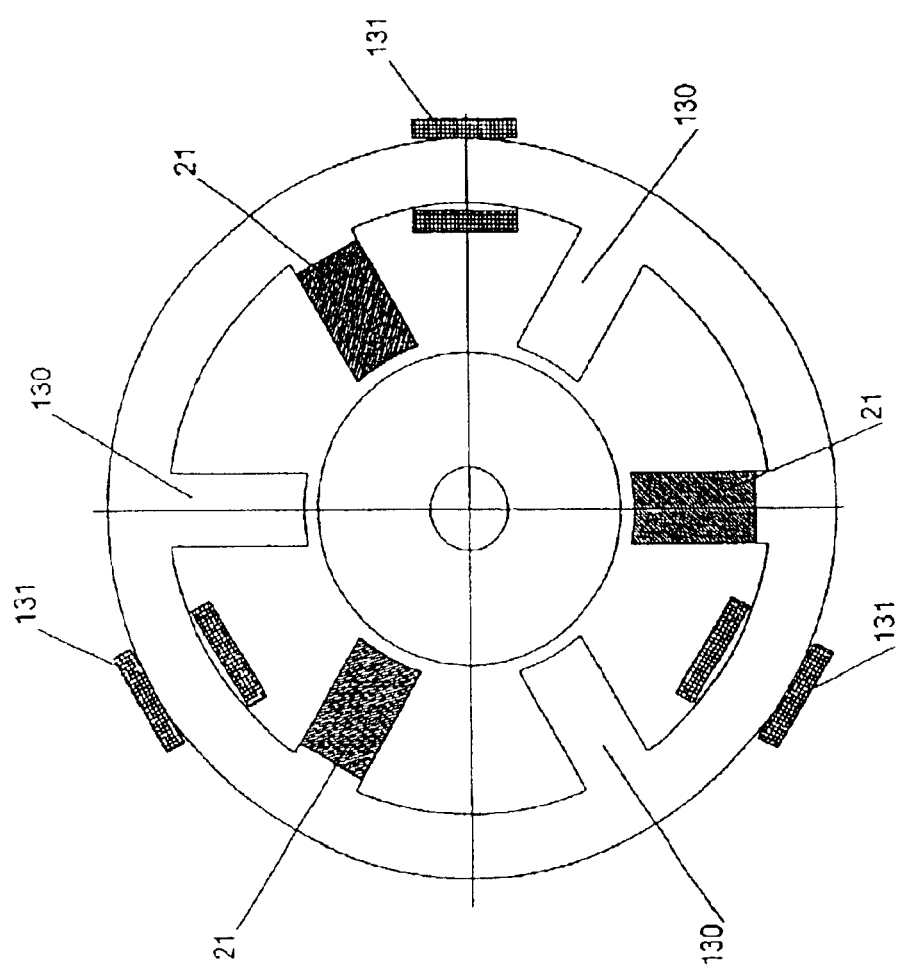
FIG. 8 shows a modified practical example with coils in the stator yoke.

FIG. 8 shows a further arrangement illustrating a three-phase multipole bearing with coils (131) disposed in the stator. In this arrangement, the ferromagnetic limbs (130) are not wound with coils. Also in this arrangement, the bias magnetization is generated by means of permanent magnets (21).

Figure 9:
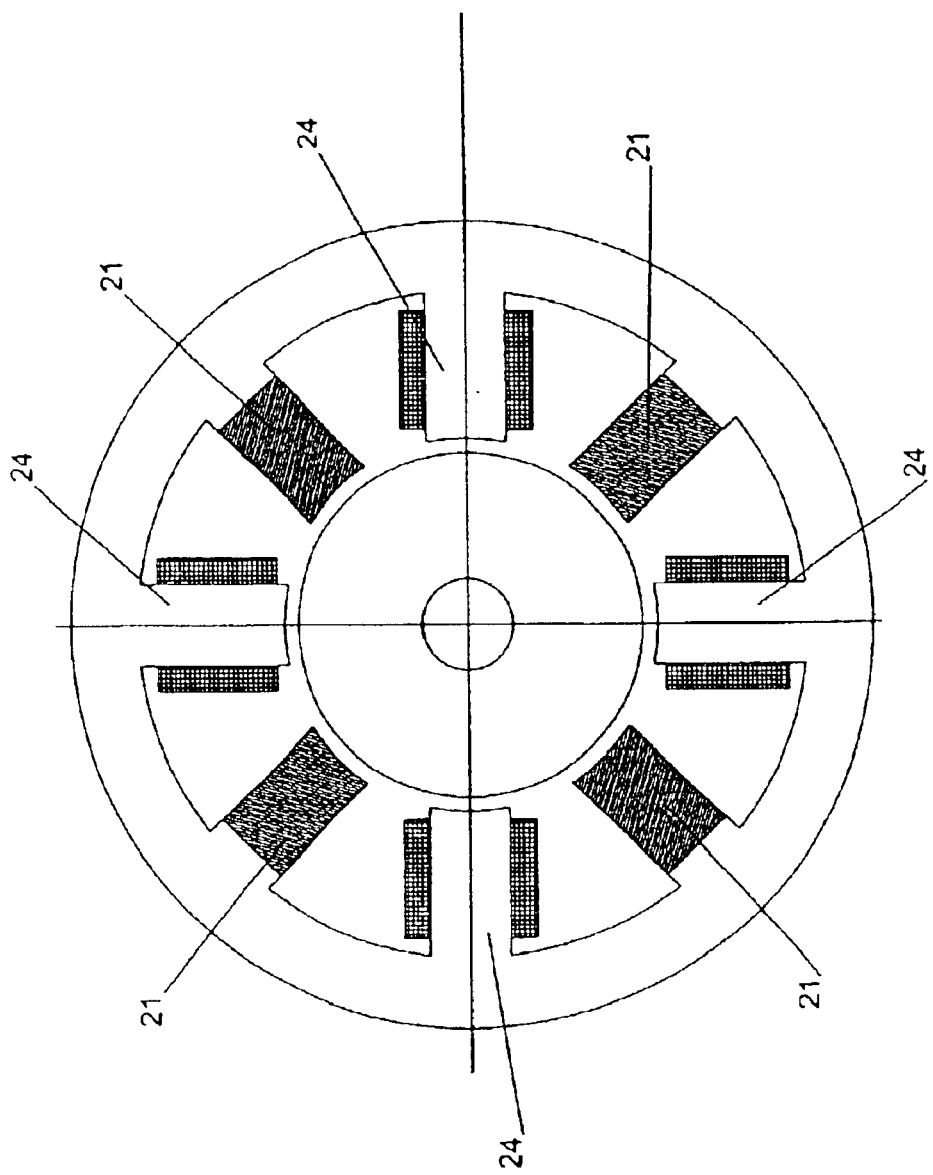
FIG. 9 shows a section through a bearing with four coil systems in a symmetric arrangement.

FIG. 9 illustrates a bearing with four electromagnetic poles (24) and four permanent-magnetic poles (21). The advantage of this arrangement is that activation takes place in Cartesian primary axes, and so there is no need for a coordinate transformation in the electronic control unit.

Figure 10:
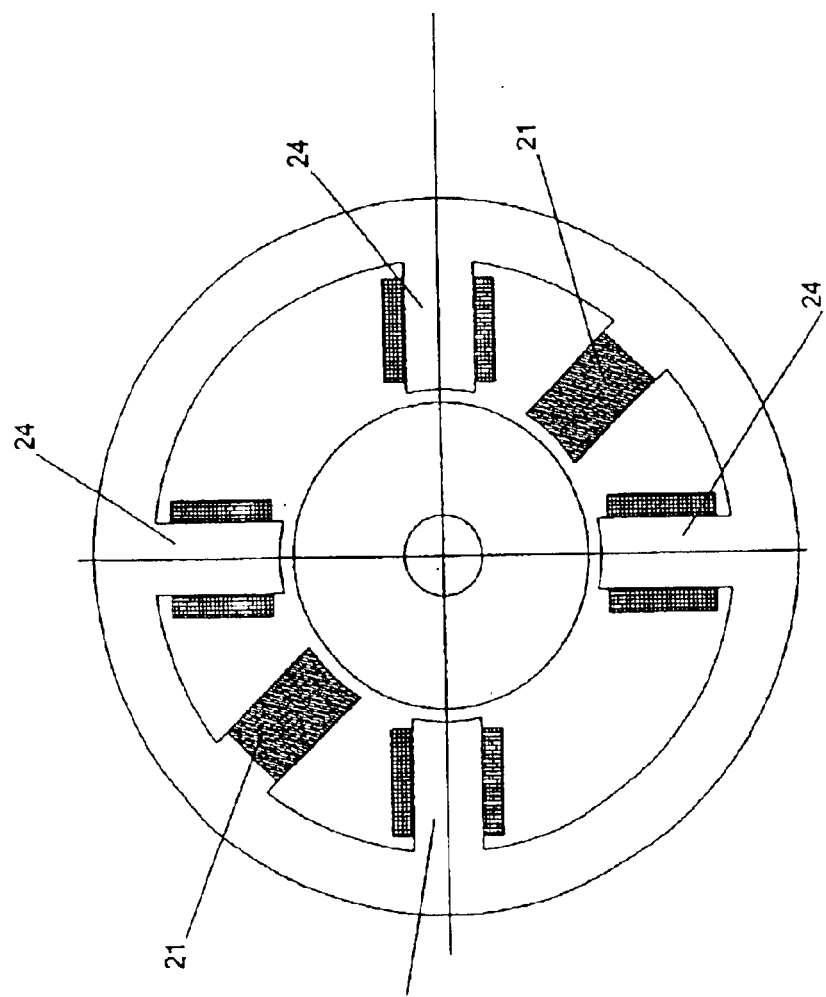
FIG. 10 shows a section through a bearing with two oppositely disposed permanent-magnetic poles.

FIG. 10 shows a further version with two permanent-magnetic poles (21), which are disposed opposite one another, and with four electromagnetic poles.

Figure 11:
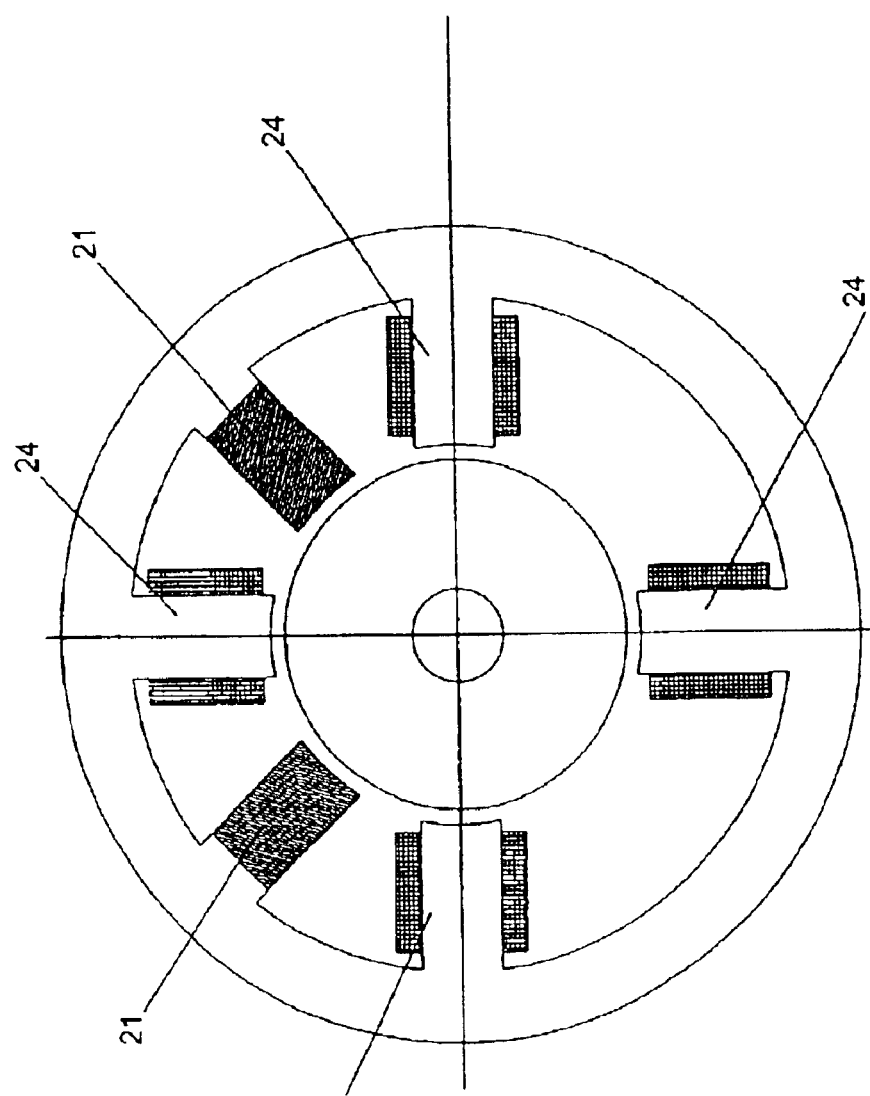
FIG. 11 shows a section through a bearing with two permanent-magnetic poles offset by 90°.

FIG. 11 shows a further embodiment with two permanent-magnetic poles (21), which are disposed at an angle of 90°, and with four electromagnetic poles. With this arrangement, partial compensation for gravity is possible without displacement of the shaft position.

Figure 12:
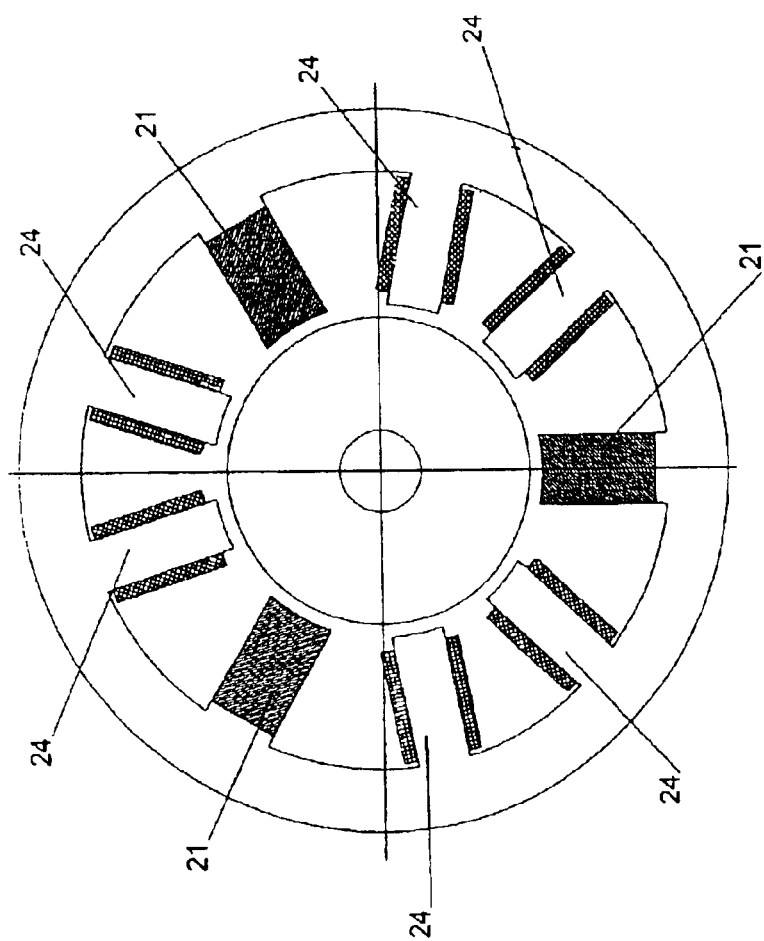
FIG. 12 shows a section through a bearing with a plurality of electromagnetic poles disposed next to one another.

FIG. 12 shows a further arrangement of the bearing, wherein a plurality of electromagnetic poles (24) in side-by-side arrangement is disposed between the permanent-magnetic poles (21). This arrangement is advantageous for large-scale applications (simple coil configuration).

Figure 13:
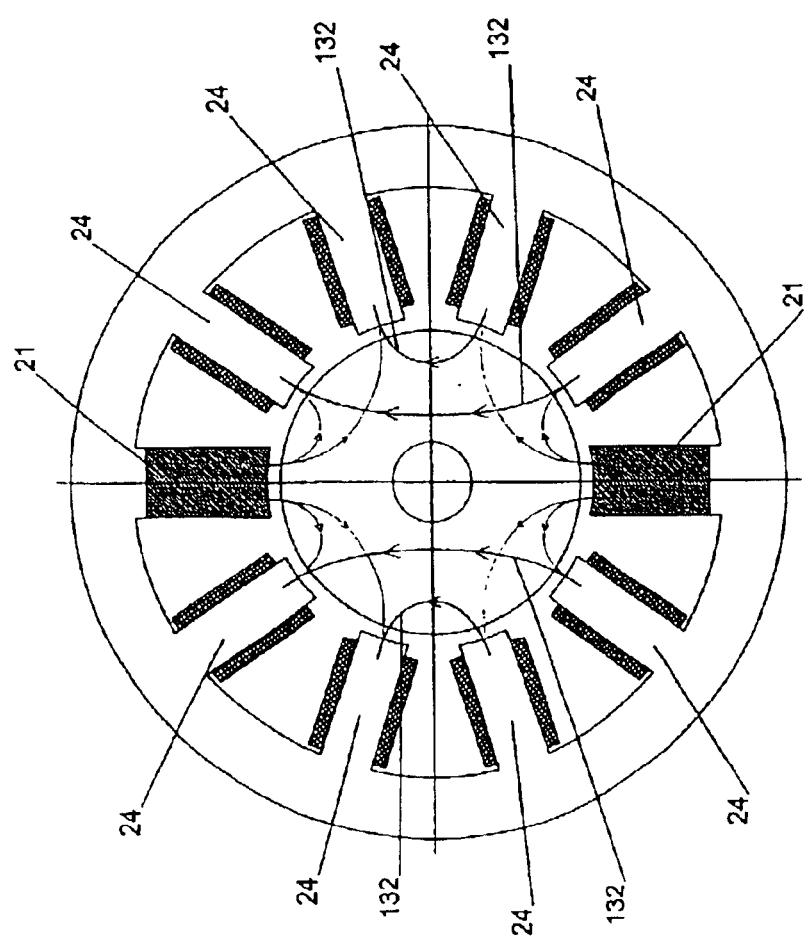
FIG. 13 shows a section through a bearing with a plurality of electromagnetic poles disposed next to one another, some having different magnetization directions.

FIG. 13 shows a further embodiment through a bearing with a plurality of electromagnetic poles (24), which are arranged side-by-side and disposed between permanent-magnetic poles (21). In this case some of the electromagnetic poles have different magnetization directions (132).

| Reference symbols | |
|---|---|
| 10 | Magnetic bearing |
| 11 | Stator |
| 20 | Rotor |
| 21 | Permanent-magnetic poles |
| 22 | Magnetic flux |
| 23 | Coil |
| 24 | Electromagnetic pole |
| 25 | Electromagnetic pole |
| 26 | Electromagnetic pole |
| 27, 28, 29 | Air gaps between rotor and electromagnetic poles |
| 30 | Magnetic flux |
| 51, 61 | Reluctance forces |
| 71 | Shaft |
| 72 | Return path |
| 73 | Magnetic flux |
| 74, 75 | Air gaps |
| 76, 77 | Multipole partial bearings |
| 81 | Permanent magnets |
| 83 | Flux-conducting pieces |
| 84 | Taper |
| 85 | End face of limb |
| 86 | Constriction |
| 87 | Stator |
| 88 | Rotor |
| 91, 92, 93 | Pole shoes |
| 94 | Air gap |
| 95 | Air gap |

-continued

| Reference symbols | |
|---|---|
| 130 | Ferromagnetic limb |
| 131 | Coils |
| 132 | Magnetization direction |
| A, B | Magnetization directions |

What is claimed is:

1. A magnetic bearing system, comprising at least one radial bearing, at least one electronic control unit and stator and rotor elements for generation of radial forces wherein the flux-forming and flux-conducting stator and rotor elements are formed from ferromagnetic parts, coils and permanent magnets, wherein one or more permanent magnets designed as magnetic poles are provided in the stator of the radial bearing having at least two coils between electromagnetic poles having at least one coil (23), said one or more permanent magnets being arranged so that a magnetic potential drop due to the fluxes generated by the permanent magnets is developed in the air gap in the angular regions of the electromagnetic poles (24, 25, 26) so that stabilization in two degrees of freedom occurs when current is applied to the coils.

2. A magnetic bearing system according to claim 1, characterized in that the air-gap flux in the angular regions of the electromagnetic poles (24, 25, 26) can be adjusted via the magnitude and sign of the coil currents in such a way that this flux, comprising an electromagnetic component and a permanent-magnetic component, has different values in the air-gap regions of different electromagnetic poles (24, 25, 26), and so a known resultant radial force is impressed on the rotor (20) via control of the coil currents.

3. A magnetic bearing system according to claim 1, characterized in that the electromagnetic poles (24, 25, 26) and the permanent-magnetic poles (21, 81) of a radial bearing are disposed substantially in one plane.

4. A magnetic bearing system according to claim 1, characterized in that the permanent-magnetic poles (21, 91, 92, 93) are designed and disposed in such a way that the air-gap flux (22) in the regions of these poles is directed either commonly inward or outward, at least in the currentless condition.

5. A magnetic bearing system according to claim 1, characterized in that the permanent-magnetic poles (21; 81; 91, 92, 93), are designed and disposed in such a way that the control-flux proportion of the electromagnetic poles (24, 25, 26) closed via the permanent-magnetic poles (21, 81) is smaller than the proportion closed via the electromagnetic poles (24, 25, 26).

6. A magnetic bearing system according to claim 1, characterized in that the permanent-magnetic poles (21, 81) are designed and disposed in such a way that the control flux of the electromagnetic poles (24, 25, 26) is closed practically not at or only to a nonsignificant extent via the permanent-magnetic poles (21, 81).

7. A magnetic bearing system according to claim 1, characterized in that the permanent-magnetic poles (21, 81) are designed and disposed in such a way that the permanent magnets (81) abuts the air gap (94) with at least one side face.

8. A magnetic bearing system according to claim 1, characterized in that the permanent-magnetic poles (21, 81) are designed and disposed in such a way that the boundary face at the air gap (94) is formed by ferromagnetic material.

9. A magnetic bearing system according to claim 1, characterized in that the permanent-magnetic poles (21, 81) are designed and disposed in such a way that the boundary face at the air gap (94) is formed by pole shoes (91, 92, 93).

10. A magnetic bearing system according to claim 1, characterized in that the permanent magnetic poles (21, 81) are designed and disposed in such a way that the permanent magnet (81) is embedded at any desired position in ferromagnetic material, and a magnetic short-circuit flux of the permanent magnet (81) is limited by appropriately thin flux-conducting pieces (83) driven to magnetic saturation.

11. A magnetic bearing system according to claim 1, characterized in that the electromagnetic poles (24, 25, 26) have limb-type design with concentrated coils or slotted design with distributed coils.

12. A magnetic bearing system according to claim 1, characterized in that the coils have chorded design.

13. A magnetic bearing system according to claim 1, characterized in that at least one ferromagnetic pole structure not provided with coils is additionally disposed in the stator (11), next to the permanent-magnetic poles (21) and/or the electromagnetic poles (24, 25, 26).

14. A magnetic bearing system according to claim 1, characterized in that the magnetic conduction of the permanent-magnetic and electromagnetic flux components in the rotor takes place through the ferromagnetic shaft itself.

15. A magnetic bearing system according to claim 1, characterized in that conduction of the permanent-magnetic and electromagnetic flux components in the rotor takes place through soft-magnetic materials in solid or laminated form.

16. A magnetic bearing system according to claim 1, characterized in that, by virtue of appropriate control of the coil currents, the sum of the fluxes added over the entire air-gap periphery yields a value equal to zero.

17. A magnetic bearing system according to claim 16, characterized in that force development in axial direction does not occur.

18. A magnetic bearing system according to claim 1, characterized in that the electromagnetic poles (24, 25, 26) are constructed in such a way by appropriate configuration of the pole geometry that strong flux expansions toward the air gap are not formed.

19. A magnetic bearing system according to claim 18, characterized in that the electromagnetic poles (24, 25, 26) are constructed in such a way by an approximately parallel design of the side faces of the flux-conducting pieces (83) or by provision of reductions (84) of cross section in the region of the air gap that strong flux expansions toward the air gap are not formed.

20. A magnetic bearing system according to claim 1, characterized in that the permanent magnetic poles (21, 81) are constructed in much a way by appropriate configuration of the pole geometry that strong flux concentrations toward the air gap (95) are not formed.

21. A magnetic bearing system according to claim 1, characterized in that the electromagnetic poles (24, 25, 26) and the permanent magnetic poles (21, 81) are constructed in such a way by appropriate configuration of the pole geometry that prefabricated coils can be slipped on over the electromagnetic poles (24, 25, 26).

22. A magnetic bearing system according to claim 21, characterized in that the electromagnetic poles (24, 25, 26) and/or the permanent-magnetic poles (21, 81) are designed without undercuts.

23. A magnetic bearing system according to claim 1, characterized in that the permanent-magnetic poles (21, 81) and/or the electromagnetic poles (24, 25, 26) are provided with lateral concavities or indentations.

24. A magnetic bearing system according to claim 1, characterized in that magnetic flux generators in the form of coils or energy-storing materials are disposed in the stator yoke.

25. A magnetic bearing system according to claim 1, characterized in that the bearing system is constructed with two radial bearings (76, 77).

26. A magnetic bearing system according to claim 1, characterized in that the ferromagnetic rotor parts of the two radial bearings (76, 77) are axially offset relative to the associated stators.

27. A magnetic bearing system according to claim 1, characterized in that, by means of appropriate control of the coil currents of the radial bearing or radial bearings, a sum of the fluxes added over the entire air-gap periphery is impressed with a non-zero summation value, and so one flux component (73) is closed via the shaft (71) and a return path (72) through the stators, and development of an axial force in addition to the radial force also takes place due to the asymmetric position of stator and rotor.

28. A magnetic bearing system according to claim 1, characterized in that the stator faces and rotor faces of the two radial bearings bounding the air gap are conically shaped in such a way that each at those radial bearings can develop both radial and axial components via the control fluxes generated by the coils of the electromagnetic poles (24, 25, 26) and via the permanent-magnetic flux component.

29. A magnetic bearing system according to claim 1, characterized in that the coils or coil assemblies of the electromagnetic poles (24, 25, 26) are star connected or delta-connected and are supplied with power semiconductors in half bridge circuitry.

30. A magnetic bearing system according to claim 1, characterized in that the coils or coil assemblies of the electromagnetic poles (24, 25, 26) are supplied independently via power semiconductors in full-bridge circuitry.

31. A magnetic bearing system according to claim 1, characterized in that sensors and/or observers are provided for determination of displacement signals.

32. A magnetic bearing system according to claim 1, characterized in that the control unit is provided with an electronic control unit an electronic power unit.

33. A magnetic bearing system according to claim 1, characterized in that the stator and rotor elements are intended for generation and radial and axial forces.

* * * * *

UNITED STATES PATENT AND TRADEMARK OFFICE
CERTIFICATE OF CORRECTION

PATENT NO. : 6,794,780 B2
DATED : September 21, 2004
INVENTOR(S) : Silber et al.

It is certified that error appears in the above-identified patent and that said Letters Patent is hereby corrected as shown below:

Title page,
Item [75], Inventors, please change "Wolfgant Amrhein" to correctly read:
-- Wolfgang Amrhein --.
Column 12,
Line 19, after "control unit" please insert the word: -- and --.

Signed and Sealed this

Fourteenth Day of December, 2004

JON W. DUDAS
*Director of the United States Patent and Trademark Office*

EX PARTE REEXAMINATION CERTIFICATE (6051st)
United States Patent
Silber et al.

(10) Number: US 6,794,780 C1
(45) Certificate Issued: Dec. 11, 2007

(54) MAGNETIC BEARING SYSTEM

(75) Inventors: Siegfried Silber, Kirschschlag (AT); Wolfgant Amrhein, Ottensheim (AT)

(73) Assignee: Lust Antriebstechnik GmbH, Lahnau (DE)

Reexamination Request:
No. 90/007,760, Oct. 11, 2005

Reexamination Certificate for:
Patent No.: 6,794,780
Issued: Sep. 21, 2004
Appl. No.: 10/169,172
Filed: Jun. 27, 2002

Certificate of Correction issued Dec. 14, 2004.

(22) PCT Filed: Dec. 22, 2000
(86) PCT No.: PCT/EP00/13146
§ 371 (c)(1),
(2), (4) Date: Jun. 27, 2002
(87) PCT Pub. No.: WO01/48389
PCT Pub. Date: Jul. 5, 2001

(30) Foreign Application Priority Data
Dec. 27, 1999 (AT) ............................................. 2184/99

(51) Int. Cl.
*H02K 7/09* (2006.01)

(52) U.S. Cl. ..................................... 310/90.5
(58) Field of Classification Search .............. 310/90.5, 310/181
See application file for complete search history.

(56) References Cited

U.S. PATENT DOCUMENTS

| | | | |
|---|---|---|---|
| 4,387,935 A | * 6/1983 | Studer | ........................ 310/90.5 |
| 4,468,801 A | 8/1984 | Sudo et al. | |
| 4,483,570 A | 11/1984 | Inoue | |
| 4,774,424 A | 9/1988 | Habermann | |
| 5,051,637 A | * 9/1991 | Harris et al. | ................ 310/90.5 |
| 5,126,610 A | * 6/1992 | Fremerey | .................... 310/90.5 |
| 5,216,308 A | 6/1993 | Meeks | |
| 5,321,329 A | * 6/1994 | Hovorka | .................... 310/90.5 |
| 5,398,571 A | 3/1995 | Lewis | |
| 6,127,764 A | 10/2000 | Török | |

FOREIGN PATENT DOCUMENTS

| | | |
|---|---|---|
| WO | WO 90/14525 | 11/1990 |
| WO | WO 97/07341 | * 2/1997 |
| WO | WO 98/25330 | 6/1998 |

OTHER PUBLICATIONS

International Search Report (German& English) Jun. 22, 2001.

Office Action of European Patent Office (German& English) PCT/EP00/13146 Mar. 4, 2002.

International Preliminary Examination Report (German&English) Apr. 8, 2002.

* cited by examiner

*Primary Examiner*—Matthew C. Graham

(57) ABSTRACT

A magnetic bearing for generating magnetic forces. A configuration of electromagnetic poles and of permanent magnetic poles which, to the greatest possible extent, is planar enables the generation of a magnetic flux in the air gaps toward the rotor, also in the de-energized state. If this flux is modulated using a control flux, magnetic forces can be exerted upon the rotor for the purpose of providing magnetic support. This configuration makes it possible to provide magnetic bearings of a simple mechanical design.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 29 and 30 are cancelled.

Claims 1 and 12 are determined to be patentable as amended.

Claims 2–11, 13–28 and 31–33, dependent on an amended claim, are determined to be patentable.

New claims 34–38 are added and determined to be patentable.

1. A magnetic bearing system, comprising at least one radial bearing, *designed as a multipole bearing,* at least one electronic control unit and stator and rotor elements for generation of radial forces, wherein the flux-forming and flux-conducting stator and rotor elements are formed from ferromagnetic parts, coils and permanent magnets, wherein [one or more] permanent magnets designed as magnetic poles are provided in the stator of the radial bearing having at least two coils between electromagnetic poles having at least one coil (23), said [one or more] permanent magnets being arranged so that a magnetic potential drop due to the fluxes generated by the permanent magnets is developed in the air gap in the angular regions of the electromagnetic poles [(24, 25, 26)] so that stabilization in two degrees of freedom occurs when current is applied to the coils, *and wherein the coils or coil assemblies of the electromagnetic poles are star-connected or delta-connected and are supplied with power semiconductors in half-bridge circuitry.*

12. A magnetic bearing system according to claim [1] *11*, characterized in that the coils have chorded design.

*34. A magnetic bearing system, comprising at least one radial bearing, designed as a multipole bearing, at least one electronic control unit and stator and rotor elements for generation of radial forces, wherein the flux-forming and flux-conducting stator and rotor elements are formed from ferromagnetic parts, coils and permanent magnets, wherein permanent magnets designed as magnetic poles are provided in the stator of the radial bearing having at least two coils between electromagnetic poles having at least one coil (23), said permanent magnets being arranged so that a magnetic potential drop due to the fluxes generated by the permanent magnets is developed in the air gap in the angular regions of the electromagnetic poles so that stabilization in two degrees of freedom occurs when current is applied to the coils, and wherein the coils or coil assemblies of the electromagnetic poles are supplied independently via power semiconductors in full-bridge circuitry.*

*35. A magnetic bearing system according to claim 34, further comprising a taper (84) of the electromagnetic poles (24, 25, 26), whereby a high current-force factor is achieved with simultaneous minimization of the magnetic leakage flux.*

*36. A magnetic bearing system according to claim 34, further comprising a pole shoe (91) adjacent to said permanent magnetic (81) and a displacement-force factor is reduced by making the end face (85) of the limb of the pole shoe (91) is enlarged and a constriction (86) achieves minimization of the leakage flux, and flux conducting piece (83) surrounding both said permanent magnet (81) and said pole shoe (91).*

*37. A magnetic bearing system according to claim 1, further comprising a taper (84) of the electromagnetic poles (24, 25, 26), whereby a high current-force factor is achieved with simultaneous minimization of the magnetic leakage flux.*

*38. A magnetic bearing system according to claim 1, further comprising a pole shoe (91) adjacent to said permanent magnetic (81) and a displacement-force factor is reduced by making the end face (85) of the limb of the pole shoe (91) is enlarged and a constriction (86) achieves minimization of the leakage flux, and flux conducting piece (83) surrounding both said permanent magnet (81) and said pole shoe (91).*

\* \* \* \* \*